US009812703B2

(12) United States Patent
Furukawa et al.

(10) Patent No.: US 9,812,703 B2
(45) Date of Patent: Nov. 7, 2017

(54) ELECTRODE AND ELECTRICAL STORAGE DEVICE FOR LEAD-ACID SYSTEM

(75) Inventors: Jun Furukawa, Fukushima (JP); Daisuke Monma, Fukushima (JP); Lan Trieu Lam, Springvale (AU); Rosalie Louey, Donvale (AU); Nigel Peter Haigh, Wallen (AU)

(73) Assignees: COMMONWEALTH SCIENTIFIC AND INDUSTRIAL RESEARCH ORGANISATION, Campbell (AU); THE FURUKAWA BATTERY CO., LTD, Yokohama (JP)

( * ) Notice: Subject to any disclaimer, the term of this patent is extended or adjusted under 35 U.S.C. 154(b) by 118 days.

(21) Appl. No.: 13/996,934

(22) PCT Filed: Dec. 21, 2011

(86) PCT No.: PCT/AU2011/001647
§ 371 (c)(1),
(2), (4) Date: Oct. 25, 2013

(87) PCT Pub. No.: WO2012/083358
PCT Pub. Date: Jun. 28, 2012

(65) Prior Publication Data
US 2014/0127565 A1    May 8, 2014

(30) Foreign Application Priority Data

Dec. 21, 2010 (JP) ................................ 2010-284040

(51) Int. Cl.
| | |
|---|---|
| *H01M 4/14* | (2006.01) |
| *H01M 4/36* | (2006.01) |
| *H01M 4/62* | (2006.01) |
| *H01M 4/16* | (2006.01) |
| *H01M 4/583* | (2010.01) |

(52) U.S. Cl.
CPC ............... *H01M 4/14* (2013.01); *H01M 4/16* (2013.01); *H01M 4/366* (2013.01); *H01M 4/625* (2013.01); *H01M 4/583* (2013.01)

(58) Field of Classification Search
CPC .......... H01M 4/14; H01M 4/16; H01M 4/366; H01M 4/625; H01M 4/583
See application file for complete search history.

(56) References Cited

U.S. PATENT DOCUMENTS

| | | |
|---|---|---|
| 2,938,063 A | 5/1960 | Greenburg et al. |
| 3,881,954 A | 5/1975 | Maskalick |
| 4,215,190 A | 7/1980 | Ferrando et al. |
| 4,507,372 A | 3/1985 | Rowlette |
| 4,576,879 A | 3/1986 | Nakazawa et al. |
| 4,770,954 A | 9/1988 | Noordenbos |
| 4,882,132 A | 11/1989 | Monzyk et al. |
| 4,975,253 A | 12/1990 | Monzyk et al. |
| 5,069,990 A | 12/1991 | Yoshimura et al. |
| 5,077,151 A | 12/1991 | Yasuda et al. |
| 5,154,989 A | 10/1992 | Howard et al. |
| 5,252,105 A | 10/1993 | Witherspoon et al. |
| 5,260,855 A | 11/1993 | Kaschmitter et al. |
| 5,384,685 A | 1/1995 | Tong et al. |
| 5,393,617 A | 2/1995 | Klein |
| 5,419,977 A | 5/1995 | Weiss et al. |
| 5,429,893 A | 7/1995 | Thomas |
| 5,439,756 A | 8/1995 | Anani et al. |
| 5,455,999 A | 10/1995 | Weiss et al. |
| 5,458,043 A | 10/1995 | Jensen et al. |
| 5,464,453 A | 11/1995 | Tong et al. |
| 5,491,399 A | 2/1996 | Gregory et al. |
| 5,518,833 A | 5/1996 | Repplinger et al. |
| 5,526,223 A | 6/1996 | Wu et al. |
| 5,529,971 A | 6/1996 | Kaschmitter et al. |
| 5,534,369 A | 7/1996 | Nagaura |

(Continued)

FOREIGN PATENT DOCUMENTS

| | | |
|---|---|---|
| CN | 1357899 | 7/2002 |
| CN | 101079510 | 11/2007 |

(Continued)

OTHER PUBLICATIONS

Russian Patent Application No. 2012111222—Office Action (English translation included), dated Aug. 27, 2014.
Russian Patent Application No. 2012111683—Office Action (English translation included), dated Sep. 3, 2014.
Office Action issued in U.S. Appl. No. 12/531,956 dated Nov. 6, 2014.
International Search Report for PCT/AU2011/001647 dated Mar. 23, 2012.
Chinese Patent Application No. 201080047297.07—First Notification of Office Action (English translation included), dated Apr. 3, 2014.
European Patent Application No. 10814794.3—Search Report, dated Dec. 2, 2013.
Japanese Patent Application No. 2012-52822—Office Action (English translation included), dated Apr. 22, 2014.

(Continued)

*Primary Examiner* — Gregg Cantelmo
(74) *Attorney, Agent, or Firm* — Nixon & Vanderhye P.C.

(57) ABSTRACT

The present invention generally relates to electrodes for use in lead-acid battery systems, batteries and electrical storage devices thereof, and methods for producing the electrodes, batteries and electrical storage devices. In particular, the electrodes comprise active battery material for a lead-acid storage battery, wherein the surface of the electrode is provided with a coating layer comprising a carbon mixture containing composite carbon particles, wherein each of the composite carbon particles comprises a particle of a first capacitor carbon material combined with particles of a second electrically conductive carbon material. The electrical storage devices and batteries comprising the electrodes are, for example, particularly suitable for use in hybrid electric vehicles requiring a repeated rapid charge/discharge operation in the PSOC, idling-stop system vehicles, and in industrial applications such as wind power generation, and photovoltaic power generation.

35 Claims, 2 Drawing Sheets

(56) References Cited

U.S. PATENT DOCUMENTS

| | | |
|---|---|---|
| 5,547,783 A | 8/1996 | Funato et al. |
| 5,574,353 A | 11/1996 | Bai et al. |
| 5,587,250 A | 12/1996 | Thomas et al. |
| 5,604,426 A | 2/1997 | Okamura et al. |
| 5,626,729 A | 5/1997 | Thompson et al. |
| 5,670,266 A | 9/1997 | Thomas et al. |
| 5,705,259 A | 1/1998 | Mrotek et al. |
| 5,744,258 A | 4/1998 | Bai et al. |
| 5,781,403 A | 7/1998 | Aoki et al. |
| 5,789,338 A | 8/1998 | Kaschmitter et al. |
| 5,821,006 A | 10/1998 | Patel et al. |
| 5,821,007 A | 10/1998 | Harshe et al. |
| 5,849,426 A | 12/1998 | Thomas et al. |
| 5,916,699 A | 6/1999 | Thomas et al. |
| 5,935,724 A | 8/1999 | Spillman et al. |
| 5,935,728 A | 8/1999 | Spillman et al. |
| 5,960,898 A | 10/1999 | Okada et al. |
| 5,993,983 A | 11/1999 | Rozon |
| 6,011,379 A | 1/2000 | Singh et al. |
| 6,072,691 A | 6/2000 | Suhara et al. |
| 6,087,812 A | 7/2000 | Thomas et al. |
| 6,088,217 A | 7/2000 | Patel et al. |
| 6,117,585 A | 9/2000 | Anani et al. |
| 6,190,805 B1 | 2/2001 | Takeuchi et al. |
| 6,195,252 B1 | 2/2001 | Belyakov et al. |
| 6,208,502 B1 | 3/2001 | Hudis et al. |
| 6,208,878 B1 | 3/2001 | Hattori et al. |
| 6,222,723 B1 | 4/2001 | Razoumov et al. |
| 6,252,762 B1 | 6/2001 | Amatucci |
| 6,294,893 B1 | 9/2001 | De Abreu |
| 6,304,467 B1 | 10/2001 | Nebrigic |
| 6,310,789 B1 | 10/2001 | Nebrigic et al. |
| 6,316,563 B2 | 11/2001 | Naijo et al. |
| 6,331,365 B1 | 12/2001 | King |
| 6,333,123 B1 | 12/2001 | Davis et al. |
| 6,466,429 B1 | 10/2002 | Volfkovich et al. |
| 6,509,116 B1 | 1/2003 | Kaneko et al. |
| 6,509,713 B2 | 1/2003 | De Abreu |
| 6,517,972 B1 | 2/2003 | Amatucci |
| 6,541,140 B1 | 4/2003 | Spillman et al. |
| 6,576,365 B1 | 6/2003 | Meitav et al. |
| 6,585,915 B2 | 7/2003 | Shinozaki et al. |
| 6,610,440 B1 | 8/2003 | LaFollette et al. |
| 6,623,884 B1 | 9/2003 | Spillman et al. |
| 6,628,504 B2 | 9/2003 | Volfkovich et al. |
| 6,631,073 B1 | 10/2003 | Sakata et al. |
| 6,643,151 B1 | 11/2003 | Nebrigic et al. |
| 6,646,415 B1 | 11/2003 | Nebrigic et al. |
| 6,653,014 B2 | 11/2003 | Anderson et al. |
| 6,680,600 B2 | 1/2004 | Emori et al. |
| 6,687,116 B2 | 2/2004 | Hudis |
| 6,706,079 B1 | 3/2004 | Shmatko et al. |
| 6,737,822 B2 | 5/2004 | King |
| 6,749,963 B2 | 6/2004 | Kurosaki et al. |
| 6,765,363 B2 | 7/2004 | LaFollette et al. |
| 6,869,731 B2 | 3/2005 | Nobuta et al. |
| 6,887,617 B2 | 5/2005 | Sato et al. |
| 6,911,273 B2 | 6/2005 | Faris |
| 7,006,346 B2 | 2/2006 | Volfkovich et al. |
| 7,035,084 B2 | 4/2006 | Kaneko et al. |
| 7,049,792 B2 | 5/2006 | King |
| 7,057,880 B2 | 6/2006 | Kurosaki et al. |
| 7,074,688 B2 | 7/2006 | Kurihara et al. |
| 7,083,876 B2 | 8/2006 | Honbo et al. |
| 7,110,242 B2 | 9/2006 | Adrianov et al. |
| 7,119,047 B1 | 10/2006 | Adrianov et al. |
| 7,144,654 B2 | 12/2006 | LaFollette et al. |
| 7,166,384 B2 | 1/2007 | LaFollette et al. |
| 7,186,473 B2 | 3/2007 | Shiue et al. |
| 7,358,008 B2 | 4/2008 | Nanno et al. |
| 7,397,650 B2 | 7/2008 | Sato et al. |
| 7,420,295 B2 | 9/2008 | Omae et al. |
| 7,462,419 B2 | 12/2008 | LaFollette et al. |
| 7,468,221 B2 | 12/2008 | LaFollette et al. |
| 7,649,335 B2 | 1/2010 | Ishikawa et al. |
| 7,742,279 B2 | 6/2010 | Takahashi et al. |
| 7,862,931 B2 | 1/2011 | Furukawa et al. |
| 8,017,273 B2 | 9/2011 | Lara-Curzio et al. |
| 8,057,937 B2 | 11/2011 | Sung et al. |
| 2001/0009734 A1 | 7/2001 | Clough |
| 2001/0011119 A1 | 8/2001 | Naijo et al. |
| 2001/0033501 A1 | 10/2001 | Nebrigic |
| 2001/0044045 A1 | 11/2001 | Sato et al. |
| 2002/0036478 A1 | 3/2002 | De Abreu |
| 2002/0037452 A1 | 3/2002 | Schmidt |
| 2002/0058185 A1 | 5/2002 | Kurosaki et al. |
| 2002/0096661 A1 | 7/2002 | Shinozaki et al. |
| 2002/0132164 A1 | 9/2002 | Kaneko et al. |
| 2002/0155327 A1 | 10/2002 | Faris |
| 2002/0158606 A1 | 10/2002 | King |
| 2002/0161146 A1 | 10/2002 | Naijo et al. |
| 2002/0163771 A1 | 11/2002 | Volfkovich et al. |
| 2002/0176221 A1 | 11/2002 | Hudis |
| 2002/0182485 A1 | 12/2002 | Anderson et al. |
| 2002/0196597 A1 | 12/2002 | Volfkovich et al. |
| 2003/0006737 A1 | 1/2003 | LaFollette et al. |
| 2003/0007317 A1 | 1/2003 | Hudis |
| 2003/0008212 A1 | 1/2003 | Akashi et al. |
| 2003/0011964 A1 | 1/2003 | Hudis |
| 2003/0035982 A1 | 2/2003 | Ryu et al. |
| 2003/0049528 A1 | 3/2003 | Honbo |
| 2003/0070916 A1 | 4/2003 | Nanno et al. |
| 2003/0091905 A1 | 5/2003 | Nobuta et al. |
| 2003/0094923 A1 | 5/2003 | Emori et al. |
| 2003/0129458 A1 | 7/2003 | Bailey |
| 2003/0152815 A1 | 8/2003 | LaFollette et al. |
| 2003/0188901 A1 | 10/2003 | Ovshinsky et al. |
| 2003/0219653 A1* | 11/2003 | Kelley et al. .................. 429/245 |
| 2003/0232238 A1 | 12/2003 | Fleming et al. |
| 2004/0018421 A1 | 1/2004 | LaFollette et al. |
| 2004/0038087 A1 | 2/2004 | Shiue et al. |
| 2004/0053124 A1 | 3/2004 | LaFollette et al. |
| 2004/0057194 A1 | 3/2004 | Hudis |
| 2004/0091777 A1 | 5/2004 | Lam et al. |
| 2004/0112486 A1 | 6/2004 | Aust et al. |
| 2004/0121204 A1 | 6/2004 | Adelman et al. |
| 2004/0141282 A1 | 7/2004 | Hudis |
| 2004/0142243 A1 | 7/2004 | Furukawa et al. |
| 2004/0161640 A1 | 8/2004 | Salot |
| 2004/0189226 A1 | 9/2004 | King |
| 2004/0209165 A1 | 10/2004 | Kurosaki et al. |
| 2004/0246658 A1 | 12/2004 | Adrianov et al. |
| 2005/0002150 A1 | 1/2005 | Volfkovich et al. |
| 2005/0081350 A1 | 4/2005 | Kurihara et al. |
| 2005/0089728 A1 | 4/2005 | Arai et al. |
| 2005/0093380 A1 | 5/2005 | LaFollette et al. |
| 2005/0110457 A1 | 5/2005 | LaFollette et al. |
| 2005/0112420 A1 | 5/2005 | Lai et al. |
| 2005/0147885 A1 | 7/2005 | Sato et al. |
| 2005/0170242 A1 | 8/2005 | Sato et al. |
| 2005/0221191 A1 | 10/2005 | Kondo et al. |
| 2005/0253458 A1 | 11/2005 | Omae et al. |
| 2005/0260497 A1* | 11/2005 | Kumashiro et al. ....... 429/231.8 |
| 2006/0038536 A1 | 2/2006 | LaFollette et al. |
| 2006/0115732 A1 | 6/2006 | Zaghib et al. |
| 2006/0172196 A1 | 8/2006 | Fukunaga |
| 2006/0223701 A1 | 10/2006 | Adrianov et al. |
| 2006/0269801 A1 | 11/2006 | Honbo et al. |
| 2007/0104981 A1 | 5/2007 | Lam et al. |
| 2007/0128472 A1 | 6/2007 | Tierney et al. |
| 2007/0247787 A1 | 10/2007 | Nakagawa et al. |
| 2008/0197810 A1 | 8/2008 | Ishikawa et al. |
| 2008/0199737 A1 | 8/2008 | Kazaryan et al. |
| 2008/0206638 A1 | 8/2008 | Takahashi et al. |
| 2008/0264291 A1 | 10/2008 | Pike et al. |
| 2008/0318135 A1 | 12/2008 | Sung et al. |
| 2009/0059074 A1 | 3/2009 | Zhamu et al. |
| 2009/0272946 A1* | 11/2009 | Lu .................. 252/511 |
| 2009/0291360 A1 | 11/2009 | Kim et al. |
| 2010/0015531 A1* | 1/2010 | Dickinson et al. ........... 429/247 |
| 2010/0075210 A1 | 3/2010 | Lee et al. |
| 2010/0175934 A1 | 7/2010 | Lam et al. |
| 2010/0203362 A1 | 8/2010 | Lam et al. |
| 2010/0214722 A1 | 8/2010 | Fujii et al. |

(56) References Cited

U.S. PATENT DOCUMENTS

| | | |
|---|---|---|
| 2011/0151286 A1 | 6/2011 | Lam et al. |
| 2011/0177392 A1 | 7/2011 | Hoshiba |
| 2012/0094174 A1 | 4/2012 | Furukawa et al. |
| 2012/0244429 A1 | 9/2012 | Lam et al. |
| 2012/0258336 A1 | 10/2012 | Jun et al. |
| 2012/0263977 A1 | 10/2012 | Furukawa et al. |
| 2014/0127565 A1 | 5/2014 | Furukawa et al. |

FOREIGN PATENT DOCUMENTS

| | | |
|---|---|---|
| CN | 101132065 | 2/2008 |
| CN | 101414691 | 4/2009 |
| EP | 0 354 966 B1 | 1/1989 |
| EP | 0 354 966 A1 | 7/1989 |
| EP | 0 555 422 B1 | 2/1992 |
| EP | 0 662 726 A2 | 12/1994 |
| EP | 0 801 834 B1 | 4/1996 |
| EP | 0 934 607 B1 | 9/1997 |
| EP | 0 964 416 A1 | 11/1997 |
| EP | 0 851 445 A2 | 12/1997 |
| EP | 0 851 445 B1 | 12/1997 |
| EP | 0 872 908 A1 | 4/1998 |
| EP | 0 872 908 B1 | 4/1998 |
| EP | 0 893 790 A2 | 7/1998 |
| EP | 0 893 790 B1 | 7/1998 |
| EP | 1 071 148 B1 | 8/1999 |
| EP | 1 115 130 A1 | 8/1999 |
| EP | 1 000 796 A2 | 11/1999 |
| EP | 1 190 480 B1 | 6/2000 |
| EP | 1 071 148 A2 | 7/2000 |
| EP | 1 126 536 A2 | 2/2001 |
| EP | 1 126 536 B1 | 2/2001 |
| EP | 1 179 871 A2 | 8/2001 |
| EP | 1 189 295 A2 | 9/2001 |
| EP | 1 189 295 B1 | 9/2001 |
| EP | 1 251 576 A2 | 4/2002 |
| EP | 1 315 227 A2 | 4/2002 |
| EP | 1 391 961 A1 | 8/2002 |
| EP | 1 391 961 B1 | 8/2002 |
| EP | 1 309 028 A2 | 10/2002 |
| EP | 1 309 028 B1 | 10/2002 |
| EP | 1 418 428 A1 | 11/2002 |
| EP | 1 496 556 A1 | 4/2003 |
| EP | 1 496 556 B1 | 4/2003 |
| EP | 1 541 422 A1 | 7/2003 |
| EP | 1 775 786 A1 | 7/2003 |
| EP | 1 561 105 B1 | 11/2003 |
| EP | 1 783 792 A1 | 7/2004 |
| EP | 1 386 336 B1 | 1/2006 |
| EP | 2 184 796 A1 | 7/2007 |
| FR | 2 692 077 | 12/1993 |
| JP | S59-105266 | 6/1984 |
| JP | 61-283173 | 12/1986 |
| JP | 62-103976 | 5/1987 |
| JP | 03-129667 | 3/1991 |
| JP | 4061214 | 2/1992 |
| JP | H04-43557 | 2/1992 |
| JP | 4-233170 | 8/1992 |
| JP | 4-294515 | 10/1992 |
| JP | H06-128317 | 5/1994 |
| JP | 09-092272 | 4/1997 |
| JP | H10-021900 | 1/1998 |
| JP | 10-50565 | 2/1998 |
| JP | H10-294135 | 11/1998 |
| JP | H11-097319 | 4/1999 |
| JP | H11-224699 | 8/1999 |
| JP | 2000-1595 | 1/2000 |
| JP | 2000-13915 | 1/2000 |
| JP | 2000-21408 | 1/2000 |
| JP | 2000-77076 | 3/2000 |
| JP | 2000-235858 | 8/2000 |
| JP | 2001-110418 | 4/2001 |
| JP | 2001-126757 | 5/2001 |
| JP | 2001-313237 | 11/2001 |
| JP | 2001-319655 | 11/2001 |
| JP | 2001-332264 | 11/2001 |
| JP | 2001-351688 | 12/2001 |
| JP | 2002-47372 | 2/2002 |
| JP | 2002-50543 | 2/2002 |
| JP | 2002-50544 | 2/2002 |
| JP | 2002-75788 | 3/2002 |
| JP | 2002-118036 | 4/2002 |
| JP | 2002-298853 | 10/2002 |
| JP | 2002-367613 | 12/2002 |
| JP | 2003-51306 | 2/2003 |
| JP | 2003-77458 | 3/2003 |
| JP | 2003-87988 | 3/2003 |
| JP | 2003-132941 | 5/2003 |
| JP | 2003-200739 | 7/2003 |
| JP | 2004-47613 | 2/2004 |
| JP | 2004-55240 | 2/2004 |
| JP | 2004-55541 | 2/2004 |
| JP | 2004-134369 | 4/2004 |
| JP | 2004-221523 | 8/2004 |
| JP | 2004-273443 | 9/2004 |
| JP | 2004-355823 | 12/2004 |
| JP | 2005-32938 | 2/2005 |
| JP | 2005-50582 | 2/2005 |
| JP | 2005-050582 | 2/2005 |
| JP | 2005-80470 | 3/2005 |
| JP | 2005-160271 | 6/2005 |
| JP | 2005-183632 | 7/2005 |
| JP | 2005-294497 | 10/2005 |
| JP | 2005-327489 | 11/2005 |
| JP | 2005-353652 | 12/2005 |
| JP | 2006-156002 | 6/2006 |
| JP | 2006-252902 | 9/2006 |
| JP | 2006-310628 | 11/2006 |
| JP | 2006-325331 | 11/2006 |
| JP | 2007-12596 | 1/2007 |
| JP | 2007-506230 | 3/2007 |
| JP | 2007-226996 | 9/2007 |
| JP | 2007-280803 | 10/2007 |
| JP | 2008-22605 | 1/2008 |
| JP | 2008-47452 | 2/2008 |
| JP | 2008-146898 | 6/2008 |
| JP | 2008-150270 | 7/2008 |
| JP | 2008-171766 | 7/2008 |
| JP | 2009-135056 | 6/2009 |
| TW | I268005 | 12/2006 |
| WO | WO89/06865 A1 | 7/1989 |
| WO | WO94/07272 A1 | 3/1991 |
| WO | WO93/05541 A1 | 3/1993 |
| WO | WO93/14511 A1 | 7/1993 |
| WO | WO95/21466 | 8/1995 |
| WO | WO95/23437 A1 | 8/1995 |
| WO | WO96/11522 | 4/1996 |
| WO | WO96/12313 | 4/1996 |
| WO | WO96/17361 | 6/1996 |
| WO | WO96/30959 | 10/1996 |
| WO | WO97/12415 | 4/1997 |
| WO | WO98/08266 | 2/1998 |
| WO | WO98/19357 | 5/1998 |
| WO | WO 98/24100 | 6/1998 |
| WO | WO98/40925 | 9/1998 |
| WO | WO98/40926 A1 | 12/1998 |
| WO | WO98/54816 | 12/1998 |
| WO | WO99/24996 | 5/1999 |
| WO | WO00/02213 | 1/2000 |
| WO | WO00/11688 | 3/2000 |
| WO | WO00/63929 | 10/2000 |
| WO | WO01/01553 A1 | 1/2001 |
| WO | WO01/17054 A1 | 3/2001 |
| WO | WO01/41232 A2 | 6/2001 |
| WO | WO01/95410 A1 | 12/2001 |
| WO | WO02/01655 A2 | 1/2002 |
| WO | WO02/052664 A2 | 7/2002 |
| WO | WO02/087006 | 10/2002 |
| WO | WO02/091412 A1 | 11/2002 |
| WO | WO02/099956 A2 | 12/2002 |
| WO | WO03/036670 A2 | 5/2003 |
| WO | WO03/055791 A2 | 7/2003 |
| WO | WO 03/077333 | 9/2003 |
| WO | WO03/088385 A1 | 10/2003 |

(56) References Cited

FOREIGN PATENT DOCUMENTS

| | | |
|---|---|---|
| WO | WO03/094184 A1 | 11/2003 |
| WO | WO03/098648 A1 | 11/2003 |
| WO | WO2004/008560 A2 | 1/2004 |
| WO | WO2004/012964 A1 | 2/2004 |
| WO | WO2004/038051 A1 | 5/2004 |
| WO | WO2004/042394 A2 | 5/2004 |
| WO | WO2005/027255 A1 | 3/2005 |
| WO | WO2005/041343 A1 | 5/2005 |
| WO | WO2006/006218 A1 | 1/2006 |
| WO | WO2006/062349 A1 | 6/2006 |
| WO | WO 2006/109909 | 10/2006 |
| WO | WO2006/132052 A2 | 12/2006 |
| WO | WO 2007/017506 | 2/2007 |
| WO | WO 2007/034873 | 3/2007 |
| WO | WO 2007/050466 | 5/2007 |
| WO | WO2007/058421 A1 | 5/2007 |
| WO | WO 2007/097534 | 8/2007 |
| WO | WO2008/016236 A1 | 2/2008 |
| WO | WO 2008/051885 | 5/2008 |
| WO | WO 2008/070914 | 6/2008 |
| WO | WO2008/101190 A1 | 8/2008 |
| WO | WO 2008/113133 | 9/2008 |
| WO | WO 2009/013796 | 1/2009 |
| WO | WO 2009/041180 | 4/2009 |
| WO | WO 2009/071292 | 6/2009 |
| WO | WO 2009/005170 | 8/2009 |
| WO | WO 2009/094931 | 8/2009 |
| WO | WO 2009/101047 | 8/2009 |
| WO | WO 2009/128482 | 10/2009 |
| WO | WO 2010122873 A1 * | 10/2010 |

OTHER PUBLICATIONS

Lam, LT et al., "Development of ultra-battery for hybrid-electric vehicle applications", Journal of Power Sources 158 (2006) 1140-1148.
English translation of JP Office Action in 2009-540546 dated Nov. 8, 2013.
Examiner's Report No. 2 on Australian Patent Appln. No. 2004273104 dated Sep. 21, 2009.
International Search Report for PCT/AU2004/001262, dated Nov. 8, 2004.
International Search Report for PCT/AU2007/001916, dated Feb. 21, 2008.
International Search Report for PCT/AU2008/000405, dated May 20, 2008.
International Search Report for PCT/JP2010/055479, dated Jun. 22, 2010.
International Search Report for PCT/AU2010/001113, dated Oct. 27, 2010.
International Search Report for PCT/JP2010/064984, dated Nov. 22, 2010.
International Search Report for PCT/JP2010/064985, dated Nov. 30, 2010.
Office Action issued in U.S. Appl. No. 12/518,521 dated Oct. 25, 2012.
Office Action issued in U.S. Appl. No. 12/518,521 dated Jan. 17, 2013.
Office Action issued in U.S. Appl. No. 12/518,521 dated Nov. 6, 2013.
Derwent Abstract Accession No. 2006-643026/67 Class L03 & JP 2006-252902 (Kawasaki Heavy Ind Ltd.), Sep. 21, 2006 (2 pages).
Derwent Abstract Accession No. 2006-003619/01 Class L03 & JP 2005-327489 (Matsuhita Denki Sangyo KK.), Nov. 24, 2005 (2 pages).
Derwent Abstract Accession No. 2006-036969/05 Class A85, L03 (A14) & JP 2006-310628 (Nippon Zeon KK), Nov. 9, 2006 (2 pages).
Derwent Abstract Accession No. 2006-110075/11, Osaka Gas Co Ltd., (Jan. 19, 2006), 2 pages.
Derwent Abstract Accession No. 2004-683934/67, Mitsubishi Chem Corp., (Sep. 30, 2004), 2 pages.
Derwent Abstract Accession No. 2004-395525/37, Shin Kobe Electric Machinery., (Apr. 30, 2004), 2 pages.
Derwent Abstract Accession No. 2005-135458/15, TDK Corp., (Jan. 27, 2005), 2 pages.
Office Action issued in U.S. Appl. No. 12/518,521 dated Jun. 9, 2014.
Office Action issued in U.S. Appl. No. 12/518,521 dated Mar. 10, 2015.
Office Action issued in U.S. Appl. No. 13/265,944 dated Dec. 24, 2014.
Office Action issued in U.S. Appl. No. 13/265,944 dated Apr. 9, 2015.
Office Action issued in U.S. Appl. No. 13/392,774 dated Sep. 30, 2014.
Office Action issued in U.S. Appl. No. 13/392,774 dated May 21, 2015.
Office Action issued in U.S. Appl. No. 13/392,734 dated Jul. 7, 2014.
Office Action issued in U.S. Appl. No. 13/392,734 dated Feb. 27, 2015.
Office Action issued in U.S. Appl. No. 12/531,956 dated Feb. 21, 2012.
Office Action issued in U.S. Appl. No. 12/531,956 dated Aug. 1, 2012.
Office Action issued in U.S. Appl. No. 12/531,956 dated May 9, 2013.
Office Action issued in U.S. Appl. No. 12/531,956 dated Nov. 22, 2013.
Office Action issued in U.S. Appl. No. 12/531,956 dated Apr. 17, 2014.
Office Action issued in U.S. Appl. No. 12/531,956 dated Jul. 28, 2015.
Office Action issued in U.S. Appl. No. 13/392,651 dated Mar. 23, 2016.
Office Action issued in U.S. Appl. No. 13/265,944 dated Oct. 27, 2015.
Office Action issued in U.S. Appl. No. 13/392,651 dated Oct. 13, 2015.
Office Action issued in U.S. Appl. No. 13/392,734 dated Oct. 7, 2015.

* cited by examiner (i) (ii) (iii)

(iv) (v) (vi)

(vii)　　　　　　　　　　　(viii)

(ix)　　　　　　　　　　　(x)

ELECTRODE AND ELECTRICAL STORAGE DEVICE FOR LEAD-ACID SYSTEM

This application is the U.S. national phase of International Application No. PCT/AU2011/001647 filed 21 Dec. 2011 which designated the U.S. and claims priority to JP 2010-284040 filed 21 Dec. 2010, the entire contents of each of which are hereby incorporated by reference.

FIELD

The present invention generally relates to electrodes for use in lead-acid battery systems, batteries and electrical storage devices thereof, and methods for producing the electrodes, batteries and electrical storage devices.

The electrical storage devices and batteries comprising the electrodes are, for example, particularly suitable for use in hybrid electric vehicles requiring a repeated rapid charge/discharge operation in the partial state of charge (PSOC), idling-stop system vehicles, and in industrial applications such as wind power generation, and photovoltaic power generation.

BACKGROUND

International PCT publication WO2005/027255 is directed to a lead-acid storage battery comprising a negative electrode, which is suitable for use in a hybrid electric vehicle requiring repeated short periods of charge/discharge operation in the PSOC. The electrode is coated with a porous carbon mixture prepared by forming a paste from a binder material and a mixed powder comprising particles of a carbon material having a capacitor capacity and/or a pseudo-capacitor capacity and particles of a carbon material having electrical conductivity, which is then applied to the surface of the electrode plate and dried.

The lead-acid storage battery described in WO2005/027255 provides an increased cycle life compared with a lead-acid storage battery provided with a conventional negative plate. However, it has been found that as the charge/discharge cycle is repeated, Pb or $PbSO_4$ is deposited on the surfaces of the particles of the carbon material having a capacitor function and the inlets of numerous internal pores of the particles become clogged with deposited Pb or $PbSO_4$, so that the capacitor function is markedly deteriorated, and accordingly, the quick charge/discharge cycle life in the PSOC is shortened.

More particularly, with respect to the particles of the carbon material having a capacitor function, such as activated carbon or the like contained in the conventional carbon mixture coating layer, when the battery is charged to cause polarization on the lead acid negative plate for an open circuit arrangement, the material is negatively charged and adsorbs the electrical double layer protons and cations having a positive charge, and, when the battery is discharged to cause polarization on the lead acid negative plate for an open circuit arrangement, the surfaces of the particles desorb them. In addition, when the battery is further discharged to cause polarization on the lead acid negative plate (in relation to an open circuit arrangement) than the potential when not charged, the surfaces of the particles are positively charged and adsorb anions on the electrical double layer.

Thus, on the particles of the carbon material having a capacitor function, Pb ions as cations as well as protons are simultaneously adsorbed or desorbed. Therefore, the Pb ions adsorbed on the surface of activated carbon are reduced to Pb metal, and the Pb metal is deposited on the surfaces of the particles. Further, the discharging operation causes oxidation of Pb, resulting in deposition of $PbSO_4$ on the surfaces of the particles. These particles have internal pores and hence have enormous internal surface area, but they have a seemingly smooth polyhedron or spherical external shape with a small apparent surface area. Therefore, when the deposition of Pb or $PbSO_4$ on the outer surfaces of such particles occurs, the inlets of the internal pores are clogged with the deposited Pb or $PbSO_4$, so that the capacitor function is markedly deteriorated.

There is a need for alternative and improved electrodes for use in lead acid battery systems, such as electrodes and batteries that improve cycle life and ameliorate some of the disadvantages of providing high rate materials in lead acid systems, particularly in systems requiring repeated short periods of charge/discharge operation in the PSOC.

SUMMARY OF THE INVENTION

In one aspect, the present invention provides an electrode comprising active battery material for a lead-acid storage battery, wherein the surface of the electrode is provided with a coating layer comprising a carbon mixture containing composite carbon particles. Each of the composite carbon particles comprises a particle of a first capacitor carbon material coated with particles of a second electrically conductive carbon material.

In a further embodiment, each of the composite carbon particles can comprise, or consist of, particles of the second electrically conductive carbon material, and optionally third electrically conductive material, coated on the surface of a particle of the first capacitor carbon material, wherein the surface coverage on the particles of the first capacitor carbon material by the second electrically conductive carbon material, and optionally third electrically conductive material, is at least 20%.

In an embodiment, the composite carbon particles contain, or consist of, one or more particles of a first capacitor carbon material wherein each of the particles is coated with particles of a second electrically conductive carbon material, and optionally particles of a third electrically conductive carbon material. In a further embodiment, the carbon mixture containing the composite carbon particles may consist of a first capacitor carbon material, a second electrically conductive carbon material, and optionally a third electrically conductive carbon material. For example, the particles of the second electrically conductive carbon material, and optionally particles of a third electrically conductive carbon material, can be coated on at least a substantial portion of the surface of a particle of the first capacitor carbon material. The particle size of the second carbon material, and optional third carbon material, can be selected to be smaller than that of the particle size for the first capacitor carbon material such that the electrical conductivity and surface area of the composite carbon particle is improved in comparison to a particle of a first capacitor carbon material by itself.

In another embodiment, each of the composite carbon particles comprise, or consist of, particles of the second electrically conductive carbon material, and optionally third electrically conductive material, coated on the surface of a particle of the first capacitor carbon material. The surface coverage on the particles of the first capacitor carbon material by the second electrically conductive carbon material (and optionally third electrically conductive material) may be at least 20%, at least 30%, at least 40%, at least 50%, at least 60%, at least 70%, at least 80%, at least 90%, or at least 95%. The surface coverage on the particles of the first capacitor carbon material by the second electrically conductive carbon material (and optionally third electrically conductive material) may be in the range of 20% to 99%, 40% to 98%, 60% to 95%, 70% to 95%, or 80% to 95%.

In an embodiment, the particle size of the second electrically conductive carbon material is one-fifth or less of that of the first capacitor carbon material. In a preferred embodiment, the particle size of the second electrically conductive carbon material is one-tenth or less of that of the first capacitor carbon material.

The first capacitor carbon material can be selected from at least one of activated carbon and carbon black. In an embodiment, the first capacitor carbon material is activated carbon. The first capacitor carbon material may be a high specific surface area carbonaceous material. The first capacitor carbon material may have a specific surface area of at least 500 m$^2$/g measured by adsorption using BET isotherm and preferably at least 1000 m$^2$/g.

The second electrically conductive carbon material can be selected from at least one of carbon black, graphite, glassy carbon, and a nanocarbon fibre. The nanocarbon fibre may be selected from a carbon nanowire, a carbon nanotube or a carbon whisker. In an embodiment, the second electrically conductive carbon material is carbon black. The carbon black can be selected from at least one of acetylene black, furnace black and ketjen black. The second electrically conductive carbon material may be a high electrically conductive carbonaceous material. The second electrically conductive carbon material may have a conductivity of at least 0.6 Scm$^{-1}$ at 500 KPa measured at 20° C.

In one embodiment, the particle size of the first capacitor carbon material is at least 1 μm, and the particle size of the second electrically conductive carbon material is one-tenth or less of that of the first capacitor carbon material.

In an embodiment, the carbon mixture further comprises a third electrically conductive carbon material. The third electrically conductive carbon material can be selected from carbon black, graphite, glassy carbon, or a nanocarbon fibre. The nanocarbon fibre may be selected from a carbon nanowire, a carbon nanotube, or a carbon whisker. In an embodiment, the third electrically conductive carbon material is a vapour growth nanocarbon fibre.

In another embodiment, the first capacitor carbon material is activated carbon, the second electrically conductive carbon material is carbon black, and the third electrically conductive carbon material is a nanocarbon fibre.

In another embodiment, the coating layer of the carbon mixture comprises 4 to 100 parts by weight of the second electrically conductive carbon material relative to 100 parts by weight of the first capacitor carbon material. The coating layer of the carbon mixture can further comprise 50 parts by weight or less of the third electrically conductive carbon material relative to 100 parts by weight of the first capacitor carbon material. The coating layer of the carbon mixture can further comprise 2 to 30 parts by weight of a binder relative to 100 parts by weight of the first capacitor carbon material.

In one particular embodiment, the coating layer of the carbon mixture comprises 4 to 100 parts by weight of the second electrically conductive carbon material relative to 100 parts by weight of the first capacitor carbon material, 50 parts by weight or less of the third electrically conductive carbon material, 2 to 30 parts by weight of a binder, 20 parts by weight or less of a thickener, and 20 parts by weight or less of a short fiber relative to 100 parts by weight of the first capacitor carbon material.

In another embodiment, the amount of the carbon mixture for the coating layer of the electrode is 1 to 15% by weight relative to the weight of the active battery material on the electrode.

The electrode can be a negative electrode comprising negative active battery material for a lead-acid storage battery. The electrode can be a positive electrode comprising positive active battery material for a lead-acid storage battery.

The carbon mixture for the electrode can contain composite carbon particles produced by at least one of grinding, granulating and unifying, the particles of the first capacitor carbon material with at least the particles of the second electrically conductive carbon material. The grinding can involve bead or ball milling. The carbon mixture may contain particles of a first capacitor carbon material with particles of a second electrically conductive carbon material, and optionally particles of a third electrically conductive carbon material.

In another aspect, the present invention provides a hybrid negative plate for a lead-acid storage battery, wherein the surface of a negative plate is provided with a coating layer of a carbon mixture containing composite carbon particles each comprising a particle of a first carbon material having a capacitor capacity and/or a pseudo-capacitor capacity and particles of a second carbon material having electrical conductivity covering and combining with the surface of the particle of the first carbon material.

In one embodiment, the particle size of the second carbon material is one-tenth or less of that of the first carbon material. In another embodiment, the carbon mixture is prepared by adding a third carbon material having high electrical conductivity to the hybrid carbon particles and mixing them is coated onto the negative plate. The first carbon material may be activated carbon or carbon black, the second carbon material may be selected from carbon black, graphite, glassy carbon, a carbon nanowire, a carbon nanotube or a carbon whisker, and the third carbon material may be selected from carbon black, graphite, glassy carbon, a carbon nanowire, a carbon nanotube, or a carbon whisker. In another embodiment, the carbon mixture layer can comprise the composite carbon particles containing 4 to 100 parts by weight of the second carbon material relative to 100 parts by weight of the first carbon material, 50 parts by weight or less of the third carbon material, 2 to 30 parts by weight of a binder, 20 parts by weight or less of a thickener, and 20 parts by weight or less of a short fiber relative to 100 parts by weight of the first carbon.

In another embodiment, the amount of the carbon mixture for coating on the surface of the negative plate is 1 to 15% by weight relative to the weight of a negative active material on the negative plate.

The present invention also provides an electrical storage device for a lead acid based system comprising electrodes as described in the above aspects or embodiments of the invention. The electrical storage device can be a lead-acid storage battery.

BRIEF DESCRIPTION OF THE DRAWINGS

Preferred embodiments of the present invention will now be further described and illustrated, by way of example only, with reference to the accompanying drawings in which:

FIG. 2(*b*) provides scanning electron micrographs showing mixed particles of a first capacitor carbon material (100 parts by weight) and a second electrically conductive carbon (60 parts by weight) of Comparison Example 1 (note for representations (x) and (xi), the same magnification of the micrographs is used in FIG. 2(*a*) for representations (viii) and (ix) respectively, either ×5000 or ×10000).

DETAILED DESCRIPTION

Figure 1A:
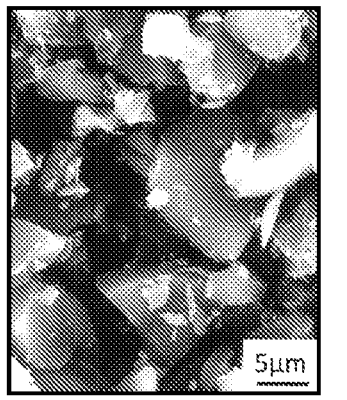
FIG. 1(a) provides scanning electron micrographs showing particles of the first capacitor carbon material of activated carbon (representations i, ii and iii)
Figure 1A:
Figure 1A:

The present invention will be further described with reference to preferred embodiments, which are provided by way of example only.

The aspects and embodiments of the present invention provide a number of advantages over known or conventional lead acid battery systems. Advantages provided by at least some of the preferred embodiments are described as follows.

An improved or "hybrid" electrode is produced by providing a coating layer comprising a carbon mixture containing the composite carbon particles as described herein. Electrodes are typically formed by using a metal plate comprising an active battery material, in which the materials being used can be selected to provide for a negative or positive electrode for a lead-acid based system. Typical electrical storage devices for lead acid based systems involve lead-acid batteries comprising at least one positive electrode and at least one negative electrode in a sulphuric acid electrolyte solution.

An electrical storage device or lead-acid storage battery comprising an electrode containing a coating layer comprising the composite carbon particles can provide an increased cycle life, particularly in the case where a quick charge/discharge operation in the PSOC is repeatedly required.

Composite Carbon Particles

The composite carbon particles used in a coating layer for the electrodes each comprise a particle of a first capacitor carbon material coated with particles of a second electrically conductive carbon material, and optionally a third electrically conductive carbon material.

The particles of the second carbon material coat the surface of the particles of the first carbon material. The coating may be such that the first and second carbon particles are considered to cover, combine or adhere together. The composite carbon particles are then typically coated onto a surface of an electrode as a paste (including other materials) to produce an improved electrode, which may also be referred to as a "hybrid" electrode. In a lead-acid storage battery provided with the hybrid electrode of the invention, even when the charge/discharge operation is repeatedly performed, the surface of the particle of the first capacitor carbon material is protected by the particles of the second electrically conductive carbon material, and optionally particles of a third electrically conductive carbon material. Particles of the second electrically conductive carbon material (and third electrically conductive carbon material if present) cover the surface of the particle of the first capacitor carbon material to reduce or suppress clogging of the pores in the particles of the first capacitor carbon material by deposited Pb or $PbSO_4$. Accordingly, in comparison to a conventional lead-acid storage battery, the cycle life is surprisingly improved for a lead-acid storage battery provided with an electrode (also referred to as a "hybrid" electrode or plate) that is provided with a coating layer of a carbon mixture comprising composite carbon particles of the first capacitor carbon material coated with particles of the second electrically conductive carbon material (and third electrically conductive carbon material if present).

The composite carbon particles can contain, or consist of, one or more particles of a first capacitor carbon material wherein each of the particles are coated with particles of a second electrically conductive carbon material, and optionally particles of a third electrically conductive carbon material. For example, the particles of the second electrically conductive carbon material, and optionally particles of a third electrically conductive carbon material, can cover and adhere to at least a substantial portion of the surface of a particle of the first capacitor carbon material. The particle size of the second carbon material, and optional third carbon material, can be selected to be smaller than that of the particle size for the first capacitor carbon material to enable coating, and can be selected such that the electrical conductivity and surface area of the composite carbon particle is improved relative to a particle of a first capacitor carbon material. The smaller particle size for the second and third carbon materials can provide effective face contact between particles and enable good electrical conduction between the particles. Relative to a particle of a first capacitor carbon material per se, the larger surface area of the composite carbon particles, provided by the smaller particle size of the second and third carbon materials, also mitigates, in use, clogging of the first capacitor material from Pb and PbSO4.

It will be appreciated that the adherence of the coating of the second (and optionally third) electrically conductive carbon material to the surface of the first capacitor carbon material may typically involve an intermolecular surface interaction, for example dipole-dipole interactions such as van der Waals interaction and London dispersion forces or pi bonding interactions.

In one embodiment, the particles of the second electrically conductive carbon material, and optionally particles of a third electrically conductive carbon material, can be coated to at least a substantial portion of the surface of a particle of the first capacitor carbon material.

In another embodiment, each of the composite carbon particles comprise, or consist of, particles of the second electrically conductive carbon material (and optionally third electrically conductive material) coated on the surface of a particle of the first capacitor carbon material.

The surface coverage on the particles of the first capacitor carbon material by the second electrically conductive carbon material (and optionally third electrically conductive material) may be at least 20%, at least 30%, at least 40%, at least 50%, at least 60%, at least 70%, at least 80%, at least 90%, or at least 95%. The surface coverage on the particles of the first capacitor carbon material by the second electrically conductive carbon material (and optionally third electrically conductive material) may be in the range of 20% to 99%, 40% to 98%, 60% to 95%, 70% to 95%, or 80% to 95%.

It will be appreciated that the surface coverage on the particles of the first carbon material by the second carbon material relates to the average amount of coverage on the outside surface of a representative sample of the composite carbon particles. A representative area of the outside surface of a composite carbon particle can for example be identified using scanning electron microscopy (SEM), and the average surface area of particles of a first capacitor carbon material coated by particles of a second carbon material can be measured, such as by visual and computational analysis. It will be appreciated that various other analytical techniques may be used to determine surface coverage of the smaller particles coating larger particles.

In a further embodiment, the ratio by weight % of the first capacitor carbon material to the second electrically conductive carbon material in the composite carbon particles may be in the range of 25:1 to 1:1, 20:1 to 10:9, 15:1 to 10:8, 10:1 to 10:7, or 5:1 to 10:6. In another embodiment, the ratio by weight % of the first capacitor carbon material to the second electrically conductive carbon material in the composite carbon particles is at least 2:1, at least 3:1, or at least 4:1. If the optional third electrically conductive carbon material is present, then the ratio by weight % of the first capacitor carbon material to the third electrically conductive carbon material in the composite carbon particles may be less than 1:2, less than 1:3, less than 1:4, or less than 1:5. An advantage provided by the composite carbon particles is that a lower relative amount of electrically conductive carbon black material can be used in the carbon mixture while, in use, achieving high performance.

To produce the composite carbon particles in which the surface of the particle of the first capacitor carbon material is combined with the particles of the second electrically conductive carbon material having a smaller particle size (than that of the first carbon material), a grinding apparatus such as a bead mill or a ball mill, a granulation apparatus, or a unifying apparatus such as a mechanofusion or a hybridizer can be used. The hybrid or composite carbon particles may be produced using a laser, arc discharge, an electron beam, or the like, although these methods are expensive. Other methods may achieve a coating or surface adherence of the particles of the second carbon material to a particle of the first carbon material such that they provide a composite carbon material.

In this unification treatment of the particles, it has been shown that an effective coating may be obtained by using the second electrically conductive carbon material having a particle size which is one-tenth or less than the particle size of the first capacitor carbon material.

Figure 1B:
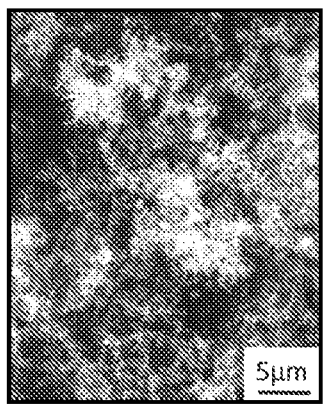
FIG. 1(*b*) provides scanning electron micrographs showing an agglomeration of particles of the second electrically conductive carbon material of acetylene black (representations iv, v and vi)
Figure 1B:
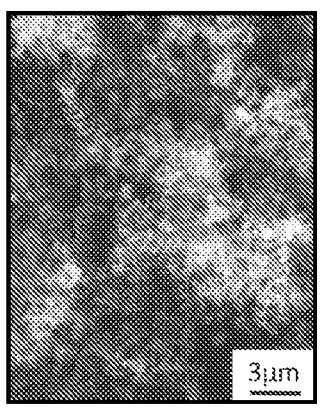
Figure 1B:
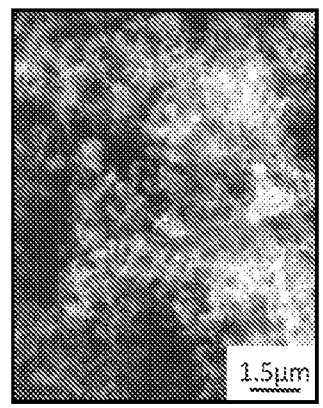

In the scanning electron micrographs of FIGS. 1(a) and 1(b), the differences can be seen in the morphology and size between the first capacitor carbon material, namely the activated carbon of FIG. 1(a) and the second electrically conductive carbon, namely acetylene black of FIG. 1(b). The first capacitor carbon material displays individual particles (representations (i), (ii) and (iii)), while the second electrically conductive carbon material shows agglomerates of smaller particles (see representations (iv), (v) and (vi)). It should be noted that the pores of the first capacitor carbon material are unable to be observed with scanning electron microscopy, although can be analyzed using transmission electron microscopy or atomic force microscopy. It will be appreciated from FIGS. 1(a) and 1(b) that the sizes of the particles of the first capacitor carbon material are substantially larger than that of the particles of the second electrically conductive carbon material. In the particular embodiment provided in FIGS. 1(a) and 1(b), the average particle size of the first capacitor carbon material is about 8 µm, while that of the second electrically conductive carbon material is about 0.1 µm.

Figure 2A:
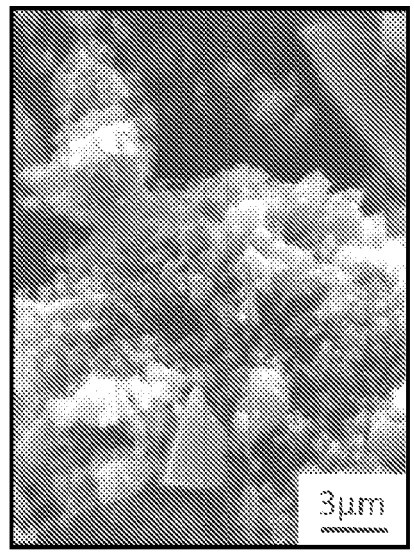
FIG. 2(*a*) provides scanning electron micrographs showing composite hybrid carbon particles produced from a first capacitor carbon material of activated carbon (100 parts by weight) and a second electrically conductive carbon material of acetylene black (60 parts by weight) of Example 1 (note for representations (viii) and (ix), the same magnification of the micrographs is used in FIG. 2(*b*) for representations (x) and (xi) respectively, either ×5000 or ×10000)
Figure 2A:
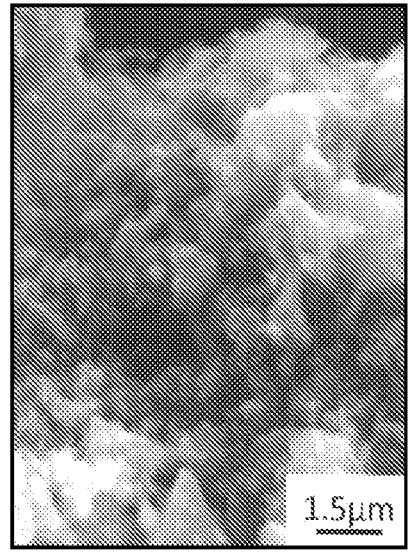
Figure 2B:
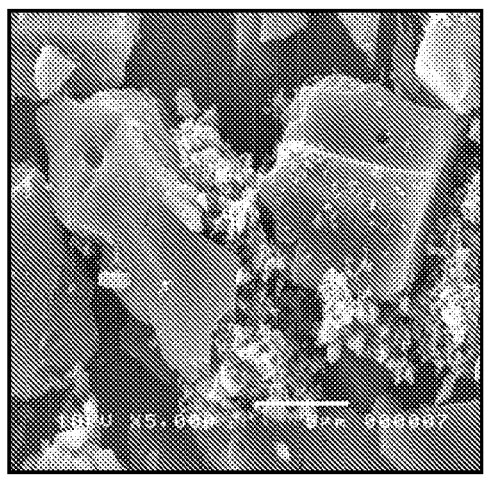
Figure 2B:
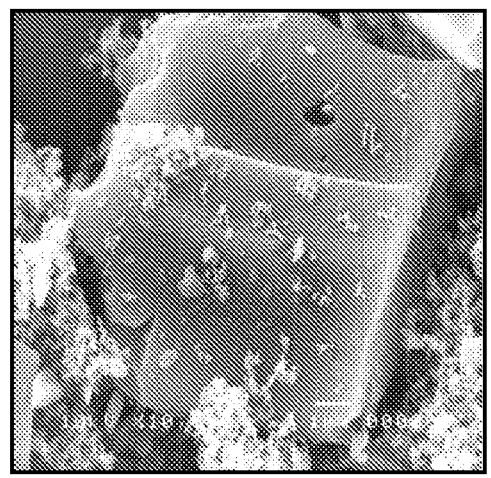

FIGS. 2(a) and 2(b) show the differences between a carbon mixture containing the composite carbon particles (see FIG. 2(a) and Example 1 below) and a carbon mixture comprising a simple mixture of the first capacitor carbon material and the second capacitor carbon material (see FIG. 2(b) and Comparative Example 1 below). In contrast to the mixed material of FIG. 2(b), the composite carbon particles in FIG. 2(a) show that the comparatively smaller second electrically conductive carbon particles coat a substantial portion of the surface of the first carbon material, for example at least 20% and up to about 95% of the surface of the first capacitor carbon material.

In contrast to the composite carbon particles of FIG. 2(a), the mixed material of FIG. 2(b) shows that there is a relatively weaker or smaller surface coating, adherence or coverage, of the second carbon particles on the surface of the first carbon particles. It can be seen in FIG. 2(b) that the particles of the second carbon material mainly exist in between the first carbon particles, indicating poor coating, adherence or surface coverage, for example the coverage of the second carbon particles on the surfaces of the first carbon particles may be less than about 5% in the mixed material. The coating and surface coverage of second carbon particles on the first carbon particles in the composite carbon particles enables a paste mixture or a coating, produced from a carbon mixture containing the composite carbon particles, to achieve better performance characteristics relative to simply mixed material.

It will be appreciated that the coating layer comprises a degree of porosity to enable permeability for a liquid electrolyte. For example, a suitable porosity may be in the range of 40-85%. In one particular embodiment, the porosity of the coating layer is about 75%.

First Capacitor Carbon Material

The first capacitor carbon material is selected from a carbon material having capacitor capacity and/or the pseudo-capacitor capacity, for example activated carbon. It will be appreciated that the first capacitor carbon material should be suitably stable in lead acid battery electrolyte solutions, such as sulphuric acid electrolyte solutions.

The first capacitor carbon material can be a "high-rate electroactive material", which may be any high-rate (or high-power) carbon based material that generally exhibits the characteristics of capacitors. Such materials are well known in the art, such as high-surface area carbon. These materials typically provide an initial high-rate or high-power output of a short duration, but have a lower energy density in comparison to a high-energy material such as active battery material that typically provides a higher amount or more sustained energy but at a lower rate. Examples of high surface area carbon materials are activated carbon, carbon black, amorphous carbon, carbon nanoparticles, carbon nanotubes, carbon fibres and mixtures thereof.

In a preferred embodiment, the first capacitor carbon material is selected from at least one of activated carbon and carbon black. In another embodiment, the first carbon material is activated carbon.

Types of activated carbons which can be used as the first capacitor carbon material include various types of activated carbon, such as those derived from synthetic resins, those derived from wooden natural materials, such as coconut shell, wood, sawdust, charcoal, lignin etc., those derived from carbon, such as lignite and peat etc., and those derived from petroleum. The carbon black includes acetylene black, furnace black, and ketjen black.

The first capacitor carbon material can be a high surface area or high specific surface area carbonaceous material. The expression "high specific surface area carbonaceous material" is well understood and commonly used in the art. Specific surface area refers to a total surface area per unit of mass. This is commonly measured by absorption using the BET isotherm. Thus, references to a BET surface area are references to a specific surface area. In addition, references to a property measured in the units of $m^2/g$ are references to a specific surface area. Regarding the expression "high", it is commonly understood in the art of the invention that certain types of materials that are used as components in electrochemical devices fall into a category known as "high surface area" or "high specific surface area" materials. A high specific surface area refers to a surface area that may be above about 500 $m^2/g$, and more typically above about 1000 $m^2/g$.

A surface area for the first capacitor carbon material can be at least 500 $m^2/g$, and more typically in the range of about 1000 $m^2/g$ and 3500 $m^2/g$. In various embodiments, the surface area of the first capacitor carbon material may be at least 1000 $m^2/g$, at least 1500 $m^2/g$, at least 2000 $m^2/g$, or in a range of 500 to 8000 $m^2/g$, 800 to 5000 $m^2/g$, 1000 to 3500 $m^2/g$, or 1500 to 3000 $m^2/g$.

The particle size of the second electrically conductive carbon material is smaller than the particle size of the first capacitor carbon material such that the second carbon material can coat the surface of the first carbon material to, in use, suppress or reduce clogging of the surface of the particles of the first carbon material, which may occur for example by deposition of Pb or $PbSO_4$. Furthermore, the second electrically conductive carbon material enhances electrical conductivity between the composite carbon particles.

The second electrically conductive carbon material can have a particle size which is one-fifth or less, one-tenth or less, one-twentieth or less, or one-fiftieth or less, than that of the first carbon material. In a preferred embodiment, the second carbon material has a particle size which is one-tenth or less of that of the first carbon material. For example, when the first carbon material has a particle size of from 3 to 30 μm, the second carbon material can have a particle size of 0.3 to 3 μm.

The particle size of the first capacitor carbon material may be less than 500 μm, less than 300 μm, less than 100 μm, less than 50 μm, less than 30 μm, less than 10 μm, or less than 5 μm. The particle size of the first capacitor carbon material may be at least 0.1 μm, at least 1 μm, at least 3 μm, at least 5 μm, or at least 10 μm. The particle size of the first capacitor carbon material may be in a range between 0.1 to 500 μm, between 1 to 100 μm, between 1 to 50 μm, or between 3 to 30 μm.

Various techniques may be used by a person skilled in the art to determine the morphology or composition of a carbon mixture including the presence or nature of composite carbon particles. For example, methods may include electron energy loss spectroscopy (EELS), X-ray photoelectron spectroscopy (XPS) or scanning electron spectroscopy (SEM). Reference materials may be used and observation/correlation tests or performance or morphology comparisons undertaken. It will be appreciated that amorphous carbon materials, which may be distinguished based on particle size, porosity, specific surface area, may also be distinguished based on other aspects such as the degree/nature of graphite/diamond type (sp2/sp3) of the material, which for example may be measured using Raman spectroscopy.

Second Electrically Conductive Carbon Material

The second electrically conductive carbon material is selected from a carbon material having electrical conductivity. It will be appreciated that the second carbon material should be suitably stable in lead acid battery electrolyte solutions, such as sulphuric acid electrolyte solutions.

In an embodiment, the second carbon material can be selected from a material having high electrical conductivity, such as a material referred as a "high electrical conductivity carbonaceous material". It will be appreciated that a smaller particle size generally provides a larger surface area for a given weight and porosity.

Typically, the conductivity of the second carbon material may be at least 0.6 $Scm^{-1}$ at 500 kPa, at least 0.19 $Scm^{-1}$ at 1000 kPa, and at least 3.0 $Scm^{-1}$ at 1500 kPa. These are measured at room temperature (20° C.). The conductivity of the material can be measured through the following conductivity test method:

i. Take 20 g sample of the material to be tested.
ii. Place a tubular conductivity testing cell having a cross-sectional area of 1 $cm^2$ onto a metal cell base. Note, for larger particles, a tubular test cell having larger cross-sectional area can be used, as described below. Carefully pack the conductivity testing cell with approximately 2 g of the sample being tested. Seal the top of the conductivity testing cell with the metal plunger. Tap gently down until enough sample fills the cell up to a height of 1 cm.
iii. Place the sample cell into the drill press so that the plunger can press against the sample when a force is applied.
iv. Apply a load to the cell. Take multimeter reading of the conductivity at the compressive force measured for that load.
v. After testing, remove all traces of the sample from the testing cell. (This can be achieved by using a bottle brush and fine sand paper.)

It is noted that the conductivity of the sample at multiple compressive forces can be tested by adding the following steps between steps iv. and v. above:

vi. Add more carbon powder to top the testing cell back up to 1 cm if required.
vii. Apply next required load to test the conductivity of the sample under an increased compressive force. Repeat as required.

The second electrically conductive carbon material can be selected from at least one of carbon black, glassy carbon, graphite, and a nanocarbon fibre. A nanocarbon fibre may be selected from a carbon nanotube, a carbon whisker, or a carbon nanowire. Each of these materials can provide electrical conductivity, and may be adhered under pressure (e.g. by grinding) to the surface of the particle of the first capacitor carbon material.

The particle size of the second electrically conductive carbon material is smaller than the particle size of the first capacitor carbon material, as described above, such that the particles of the second carbon material can coat the particles of the first capacitor carbon material, and in use, facilitate electrical conductivity between the composite carbon particles while suppressing or reducing clogging of the first carbon material, which may arise by deposition of Pb or $PbSO_4$. For example, a composite carbon particle comprises particles of a second electrically conductive carbon material adhered to the surface of a particle of a first capacitor carbon material, or to at least a substantial portion of the surface thereof.

The particle size of the second electrically conductive carbon material may be less than 100 μm, less than 50 μm, less than 10 μm, less than 5 μm, less than 1 μm, less than 0.1

µm, or less than 0.01 µm, or in a range between 0.01 to 50 µm, between 0.01 to 10 µm, between 0.01 to 5 µm, or between 0.3 to 3 µm.

For a nanocarbon fibre, such as a carbon nanowire material, can have a diameter in a range between 0.005 µm and 100 µm, between 0.005 µm and 50 µm, between 0.01 µm and 20 µm between, or between 0.01 µm and 10 µm. In a preferred embodiment, the diameter is between 0.01 µm and 10 µm. The length of the nanowire can be between 1 µm and 3000 µm, between 10 µm and 2000 µm, between 20 µm and 1000 µm, between 30 µm and 500 µm, or between 50 µm and 100 µm. In a preferred embodiment, the length is between 50 µm and 100 µm.

For a carbon nanotube material, the diameter can be in a range between 0.005 µm and 100 µm, between 0.01 µm and 50 µm between, or between 0.01 µm and 30 µm. In a preferred embodiment, the diameter is between 0.01 µm and 30 µm. The length of the nanotube can be between 1 µm and 3000 µm, between 10 µm and 2000 µm, between 20 µm and 1000 µm, between 30 µm and 500 µm, or between 50 µm and 100 µm. In a preferred embodiment, the length is between 50 µm and 100 µm.

A suitable surface area for the second electrically conductive carbon material can be in a range of about 200 to 1500 $m^2/g$. In various embodiments, the surface area of the second carbon material may be at least 100 $m^2/g$, at least 200 $m^2/g$, at least 500 $m^2/g$, or in a range of 100 to 2000 $m^2/g$, 200 to 1500 $m^2/g$, 300 to 1200 $m^2/g$, or 500 to 1000 $m^2/g$.

The mixed amount ratio between the first capacitor carbon material and the second electrically conductive carbon material is preferably 4 to 100 parts by weight of the second carbon material relative to 100 parts by weight of the first carbon material. However, it will be appreciated that certain advantages may still be provided outside of the ranges described herein. For example, the mixed amount ratio between the first carbon material and the second carbon material may be, by weight of the second carbon material relative to 100 parts by weight of the first carbon material, 10 to 90 parts of the second carbon material, 10 to 80 parts of the second carbon material, or 20 to 70 parts of the second carbon material.

With respect to the mixed amount ratio between the first capacitor carbon material and the second electrically conductive carbon material for producing the composite carbon particles as mentioned above, the second carbon material may be used in the range of from 4 to 100 parts by weight, relative to 100 parts by weight of the first carbon material. If the amount of the second carbon material is less than 4 parts by weight, a satisfactory cycle life improvement effect may not be obtained. If the amount of the second carbon material exceeds 100 parts by weight, the electrical conduction effect may become saturated. It is preferable that the amount of 10 to 80 parts by weight of the second carbon material is mixed relative to 100 parts by weight of the first carbon material and the mixture is combined together to obtain the composite carbon particles.

Third Electrically Conductive Carbon Material

The composite carbon particles may comprise a third electrically conductive carbon material to further improve the electrical conductivity (and electrical connection) of the composite carbon particles and coating layer thereof. It will be appreciated that the third electrically conductive carbon material should be suitably stable in lead acid battery electrolyte solutions, such as sulphuric acid electrolyte solutions. The conductivity of the third electrically conductive carbon material may be similar to that provided above for the second electrically conductive carbon material, or may be more electrically conductive than that of the second electrically conductive carbon material.

In an embodiment, the third electrically conductive carbon material may be selected from a material having high electrical conductivity, such as a material referred as a "high electrical conductivity carbonaceous material".

The third electrically conductive carbon material may be selected from at least one of carbon black, graphite, glassy carbon, and a nanocarbon fibre. The nanocarbon fibre may be selected from a carbon nanowire, a carbon nanotube or a carbon whisker. It will be appreciated that other materials may be used as the third electrically conductive carbon material.

With respect to the size of the third electrically conductive carbon material, where the third carbon material is in the form of particles, in an embodiment the particle size of the third carbon material may be smaller than that of the first capacitor carbon material. The particle size of the third electrically conductive carbon material may be similar in size to the second carbon material as described above. Preferably, a particle size of the third electrically conductive carbon material is one-tenth or less of that of the first carbon material.

In an embodiment, the particle size of the third electrically conductive carbon material is smaller than that of the particle size of the first capacitor carbon material, and may be less than 100 µm, less than 50 µm, less than 10 µm, less than 5 µm, less than 1 µm, less than 0.1 µm, or less than 0.01 µm, or in a range between 0.01 to 50 µm, between 0.01 to 10 µm, between 0.01 to 5 µm, or between 0.3 to 3 µm.

For further enhancing the electrical conductivity between the composite carbon particles, the amount of the third electrically conductive carbon material is preferably 50 parts by weight or less, relative to 100 parts by weight of the first capacitor carbon material. If the amount of the third carbon material exceeds 50 parts by weight, the electrical conduction effect may become saturated, and hence the amount of the third carbon material is advantageously 50 parts by weight or less from an economical point of view, but 40 parts by weight or less is more preferable.

Coating Layer

A binding agent, namely a "binder", can be used to enhance binding of the carbon mixture to the surface of the negative plate, and at the same time binding of the composite carbon particles to one another, and for binding of the third carbon material if present.

Types of binders include polychloroprene, a styrene-butadiene rubber (SBR), polytetrafluoroethylene (PTFE), and polyvinylidene fluoride (PVDF). An addition amount of the binder is typically in the range of from 2 to 30 parts by weight relative to 100 parts by weight of the first carbon material. If the amount of the binder is less than 2 parts by weight, advantages of binding effect may not be achieved, and if the amount of the binder exceeds 30 parts by weight, the binding effect may become saturated. Generally, the amount of the binder in the coating layer is preferably 5 to 15 parts by weight.

For applying the carbon mixture in the form of a paste to the electrode plate, a thickener is typically added to the carbon mixture. When an aqueous carbon mixture paste is formed, a cellulose derivative such as CMC or MC, a polyacrylic acid salt, polyvinyl alcohol, or the like is preferable as a thickener. When an organic carbon mixture paste is formed, N-methyl-2-pyrrolidone (NMP) or the like is preferable as a thickener. When the amount of the thickener to be used exceeds 20 parts by weight in terms of the dry weight relative to 100% by weight of the first capacitor carbon material, the resultant carbon mixture coating layer may be poor in electrical conductivity, and therefore the amount of the thickener is preferably 20% by weight or less.

A short fiber reinforcing material may be added to the carbon mixture. The short fiber reinforcing material is selected to be stable in sulfuric acid and may be selected from at least one of carbon, glass, polyester or the like. The short fiber reinforcing material can have a diameter of 20 μm or less and a length of 0.1 mm to 4 mm. Regarding an addition amount of the short fiber reinforcing material, if it exceeds 20 parts by weight relative to 100 parts by weight of the first carbon material, the resultant carbon mixture coating layer may have poor electrical conductivity, and therefore the addition amount of the short fiber reinforcing material is preferably 20 parts by weight or less.

A hybrid electrode plate can be produced by such a way that composite carbon particles are prepared by mixing the first carbon material and the second carbon material in the above-mentioned amounts and combining them with each other, which can be mixed with 2 to 30 parts by weight of a binder and a suitable amount of a dispersion medium to prepare a carbon mixture in a paste form and the carbon mixture paste can be applied to the surface of a negative or positive plate of the electrode (which typically already contains active battery material), which is then dried to form a porous carbon mixture coating layer. It is preferable that 1 to 15% by weight of the carbon mixture is added relative to the weight of an active material present on the negative or positive plate. If the amount of the carbon mixture is less than 1% by weight, the advantages may not be obtained, and if the amount exceeds 15% by weight, the resultant coating layer may be too thick and may cause polarization. The amount of the carbon mixture is preferably in the range of from 3 to 10% by weight.

The thickness of the coating layer (comprising the carbon mixture containing composite carbon particles) on an electrode may typically be in the range of 0.1 to 0.5 mm. In an embodiment, the thickness of the coating is provided in a range of 0.05 to 2 mm, 0.08 to 1 mm, or 0.1 to 0.5 mm, or about 0.2 mm.

The carbon mixture coating layer can be provided on one or both surfaces of an electrode.

Electrical Storage Devices

It will be appreciated that an electrical storage device includes at least one positive and negative electrode pair, wherein at least one electrode is an electrode according to the present invention.

The electrical storage device, for example a lead-acid battery, is typically assembled with an anode and cathode (or negative and positive electrode). The electrodes are typically formed from metal current collectors coated with active battery material. In relation to lead-acid batteries, the device would typically comprise at least one lead dioxide based positive electrode, a porous non-conductive separator and at least one sponge lead based negative electrode coupled together in an electrolyte solution comprising sulphuric acid. The electrical storage device can be a valve regulated device.

Electrodes generally comprise a current collector (typically a grid or plate) with an active battery material applied thereto. The active battery material is most commonly applied in a paste form to a region of the current collector. The paste may contain additives or materials other than the active battery material. The electrode may be of any suitable shape, although is typically in the form of a flat-plate (grid), or a spirally-wound plate for prismatic or spirally-wound cells. For simplicity of design, flat plates or grids are generally preferred. Current collectors usually provide the base structure of an electrode, and are typically formed from electrically conductive metals, for example a lead alloy is typically used as a current collector in lead-acid batteries. Furthermore, the materials used for the current collector should be stable in the electrolyte environment.

The term "active battery material" or like term, refers to the capability of a material to receive, store or provide a source of electrical charge and includes battery electrode materials capable of storing energy electrochemically. For example, for a lead-acid type battery, sponge lead can be used as a negative electrode material and lead dioxide can be used as a positive electrode material. It will be appreciated that the active battery materials may become activated after being applied to an electrode or placed within a battery system.

The electrical storage device can comprise one or more negative electrode, positive electrode, or positive and negative electrode pair as described herein. The electrodes and materials thereon must also have access to an electrolyte which can supply counter ions and complete the electrical circuit in the energy storage cell. Chemical compatibility must also be considered, for example, if the two materials share a common electrolyte, they both must be stable in that electrolyte.

The active battery material or coating layer comprising the composite carbon particles are typically arranged on the same current collector to be in electrical contact. Examples of this arrangement include: dual sided, layered, side-by-side, or coated.

In one embodiment, the positive electrode is a lead dioxide positive electrode and the negative electrode is a sponge lead negative electrode. The electrolyte is preferably a sulphuric acid electrolyte solution. In a preferred embodiment the coating layer of the composite carbon particles is provided on at least a portion of the negative electrode.

In another particular embodiment, an electrical storage device is provided comprising at least one lead dioxide based positive electrode and at least one sponge lead based negative electrode in a sulphuric acid electrolyte solution, wherein the negative electrode comprises:

a current collector;

a first layer deposited on the current collector, the first layer comprising active battery material of sponge lead;

a second layer in contact with at least a portion of the first layer, the second layer comprising composite carbon particles, wherein each of the composite carbon particles comprises a particle of a first capacitor carbon material coated with particles of a second electrically conductive carbon material.

Further to the above embodiment, the contact of the second layer with at least a portion of the first layer may comprise the second layer coating the first layer. It will be appreciated that advantages may be obtained by other arrangements.

The electrical storage device typically further comprises a porous non-conductive separator separating the at least one lead dioxide based positive electrode and the least one sponge lead based negative electrode.

The above embodiments of the electrical storage devices can reduce or suppress sulphation problems in devices having such problems, for example high performance lead-acid batteries operated under high-rate partial state-of-charge. In one embodiment, there is provided a use of the electrical storage devices according to the embodiments described herein under partial state-of-charge conditions (PSoC) in the range of about 20-100% (e.g. typical for electric vehicles), in the range of about 40-60% (e.g typical for hybrid electric vehicles), or in the range of about 70-90% (e.g. typical for mild hybrid electric vehicles).

Electrolyte

In the case of lead-acid batteries, any suitable acid electrolyte may be used. For lead-acid batteries, the electrolyte is typically a sulphuric acid electrolyte.

Busbars or Conductors

The busbar of a lead-acid battery may be of any suitable construction, and may be made from any suitable conductive material known in the art.

Other Battery Features

Generally, the components of the battery will be contained within a battery case with further features appropriate to the type of battery employed. For example, in the case of lead-acid batteries, the lead-acid battery may be either of a flooded-electrolyte design or of a valve-regulated design. Where the lead-acid battery is a valve-regulated lead-acid battery, the battery may be of any suitable design, and may for instance contain gel electrolyte. Specific features of the battery unit appropriate to such designs are well known in the art of the invention.

The pressure that may be applied to the lead-acid battery may lie in the range of 5-20 kPa for flooded electrolyte design, and from 20-80 kPa for valve regulated lead-acid battery design.

Separators

Generally, each of the positive and negative electrodes is separated from adjacent electrodes by porous separators. The separators maintain an appropriate separation distance between adjacent electrodes. Separators located between immediately adjacent lead-based negative electrodes and lead dioxide-based positive electrodes may be made from any suitable porous material commonly used in the art, such as porous polymer materials or absorptive glass microfibre ("AGM"). The separation distance (corresponding to separator thickness) is generally from 1-2.5 millimetres for these separators. Suitable polymer materials useful for forming the separators between the positive and negative electrodes forming the battery part are polyethylene and AGM. Polyethylene separators are suitably between 1 and 1.5 millimetres thick, whereas AGM separators are appropriately between 1.2 and 2.5 millimetres thick.

Formation of Lead-Acid Batteries

After assembling of the appropriate components together in a battery case, the lead-acid battery generally needs to be formed. The formation operation is well known in the field. It is to be understood that the references to "lead-based" and "lead dioxide-based" materials are used to refer to lead or lead dioxide itself, materials containing the metal/metal dioxide or to materials that are converted into lead or lead dioxide, as the case may be, at the given electrode.

As is indicated by the language used above, the lead-acid battery contains at least one of each type of electrode. The number of individual cells (made up of a negative and positive plate) in the battery depends on the desired voltage of each battery. For a 36-volt battery appropriate for use as a mild hybrid electric vehicle battery (which may be charged up to 42 volt), this would involve the use of 18 cells.

Electrode Arrangement

Generally the positive and negative electrodes are interleaved, so that each positive electrode has one negative electrode to one side of it. However, it will be appreciated that other electrode arrangements may be utilised depending on the application envisaged.

Particular Additives for Electrodes

If there is a mismatch in the potential window or potential operational range of one of the electrodes, hydrogen and/or oxygen gassing may occur. To suppress hydrogen gassing, the electrodes can include an additive or additive mixture comprising an oxide, hydroxide or sulfate of lead, zinc, cadmium, silver and bismuth, or a mixture thereof. Generally, it is preferred that the additive includes at least one oxide, hydroxide or sulfate of lead or zinc. For convenience, the additive is suitably one or more oxides selected from lead oxide, zinc oxide, cadmium oxide, silver oxide and bismuth oxide.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The present invention will be described in more detail with respect to Examples and Comparison Examples as follows.

EXAMPLE 1

Composite carbon particles were produced as follows. 100 parts by weight of activated carbon having an average particle size of 8 µm as a first capacitor carbon material (see FIGS. 1(a)) and 60 parts by weight of acetylene black having an average particle size of 0.1 µm as a second electrically conductive carbon material (see FIG. 1(b)) were milled together by means of a bead mill having a media diameter of 5 mm for one hour to obtain composite carbon particles, each comprising the particle of the activated carbon of which the surface covered and combined with the fine particles of acetylene black (see FIG. 2(a)). The hybrid or composite carbon particles thus obtained was added with SBR as a binder, CMC as a thickener, Polyethylene terephthalate (PET) as a short fiber reinforcing material, and water as a dispersion medium, and was then mixed using a mixer, to prepare a carbon mixture paste. The mixed composition of the carbon mixture paste is shown in Table 1.

On the other hand, positive plates and negative plates for use in a valve-regulated lead-acid storage battery were produced by a known method, and was then subjected to a tank formation treatment, and a number of respective positive and negative plates were prepared.

With respect to each of the negative plates, the above-prepared carbon mixture paste was uniformly applied to the entire surface of the negative active battery material that was previously applied to the current collector of the plate, which was then dried at 60° C. for one hour, so that a hybrid negative plate in which a porous carbon mixture coating layer having a porosity of 75% formed on both surfaces of the negative plate was produced. It has been shown that advantages were provided by the hybrid negative plate thus produced is that the porous carbon mixture coating layer has a thickness of 0.2 mm per one surface, and its weight is 5% by weight relative to the weight of the anode active material.

TABLE 1

Mixed Composition of Carbon Mixture Paste in Example 1

Composite carbon particles comprising
First carbon material: 100 parts by weight of activated carbon particles and
Second carbon material: 60 parts by weight of acetylene black particles

| Binder: | SBR | 20 parts by weight |
|---|---|---|
| Thickener: | CMC | 10 parts by weight |
| Short fiber reinforcement: | PET | 13 parts by weight |
| Dispersion medium: | Water | 700 parts by weight |

Next, 5 sheets of the above-produced hybrid negative plates and 4 sheets of the positive plates were alternately stacked through AGM (Absorbed Glass Mat) separators to assemble an element, and using the element, a 2V-cell lead-acid storage battery having a 5-hour rate capacity of 10 Ah under the positive capacity control was produced by a known method, so that a valve-regulated lead-acid storage battery was produced. In the course of production thereof, a spacer was respectively placed between the both ends of the element and a battery container so that the compression degree of the element may become 50 kPa after the element was contained in the container. As a sulfuric acid electrolytic solution, 130 ml of an aqueous sulfuric acid solution having a specific gravity of 1.30 and having dissolved therein 30 g/l of an aluminum sulfate octodecahydrate was poured into the cell. Then, for activating the cell, the charging operation was conducted at 1 A for 15 hours, and the discharging operation was conducted at 2 A until the cell voltage reached 1.75 V, and again the charging operation was conducted at 1 A for 15 hours, and the discharging operation was conducted at 2 A until the cell voltage reached became 1.75 V, and when a 5-hour rate capacity of the resultant cell was measured, it was 10 Ah.

EXAMPLE 2

A hybrid negative plate was produced in the same manner as in Example 1 except that a carbon mixture paste having the mixed composition as shown in Table 2 below, which was prepared by adding acetylene black having excellent electrical conductivity as a third carbon material to the carbon mixture paste in Example 1, was used. Using the hybrid negative plate thus produced, a 2V-cell lead-acid storage battery having a 5-hour rate capacity of 10 Ah was produced in the same manner as in Example 1.

TABLE 2

Mixed Composition of Carbon Mixture Paste in Example 2

Composite carbon particles comprising
First carbon material: 100 parts by weight of activated carbon particles and
Second carbon material: 60 parts by weight of acetylene black particles
Third carbon material: 20 parts by weight of acetylene black particles

| Binder: | SBR | 20 parts by weight |
|---|---|---|
| Thickener: | CMC | 10 parts by weight |
| Short fiber reinforcing material: | PET | 13 Parts by weight |
| Dispersion medium: | Water | 700 parts by weight |

EXAMPLE 3

A hybrid negative plate was produced in the same manner as in Example 2 except a carbon mixture paste was used having the mixed composition as shown in Table 3 below in which 20 parts by weight of a vapor growth nanocarbon fiber (VGCF) were used as the third carbon material instead of 20 parts by weight of the particles of acetylene black. Using the hybrid negative plate thus produced, a 2V-cell lead-acid storage battery having a 5-hour rate capacity of 10 Ah was produced in the same manner as in Example 1.

TABLE 3

Mixed Composition of Carbon Mixture Paste in Example 3

Composite carbon particles of
First carbon material: 100 parts by weight of activated carbon particles and
Second carbon material: 60 parts by weight of acetylene black particles

| Third carbon material: | VGCF | 20 Parts by weight |
|---|---|---|
| Binder: | SBR | 20 Parts by weight |
| Thickener: | CMC | 10 Parts by weight |
| Short fiber reinforcing material: | PET | 13 Parts by weight |
| Dispersion medium: | Water | 700 Parts by weight |

COMPARISON EXAMPLE 1

A hybrid negative plate was produced in the same manner as in Example 1 by using a carbon mixture paste having the mixed composition as shown in the following Table 4 having the same mixed composition as that of Table 1 except that the mixed powders used were prepared by merely mixing 100 parts by weight of the particles of activated carbon as the first carbon material and 60 parts by weight of the particles of acetylene black as the second carbon material (see FIG. 2(b)), without combining them together into a composite (see FIG. 2(a)). Using the hybrid negative plate thus produced, a 2V-cell lead-acid storage battery having a 5-hour rate capacity of 10 Ah was produced in the same manner as in Example 1.

TABLE 4

Mixed Composition of Carbon Mixture Paste in Comparison Example 1

Mixed powder of
First carbon material: 100 parts by weight of activated carbon particles and
Second carbon material: 60 parts by weight of acetylene black particles

| Binder: | SBR | 20 parts by weight |
|---|---|---|
| Thickener: | CMC | 10 parts by weight |
| Short fiber reinforcing material: | PET | 13 parts by weight |
| Dispersion medium: | Water | 700 parts by weight |

COMPARISON EXAMPLE 2

A 2V-cell lead-acid storage battery having a 5-hour rate capacity of 10 Ah was produced in the same manner as in Example 1 except that an element was assembled from sheets of the negative plates which are the same as those in Example 1 and which are not yet applied with the carbon mixture paste, and 4 sheets of the positive plates and the separators which are the same as those in Example 1.

Life Test

With respect to each of the lead-acid storage batteries in Examples 1 to 3 and the lead-acid storage batteries in Comparison Examples 1 and 2 as produced above, a life test was conducted by repeating a quick charge/discharge operation in the PSOC based on the simulation of driving of an HEV. Specifically, each storage battery was discharged at 2 A for one hour so that the SOC was made 80%, and thereafter the discharging operation at 50 A for one second and the charging operation at 20 A for one second was repeated 500 times, and then the charging operation at 30 A for one second and a pause period of one second was repeated 510 times. This was counted as one cycle. This cycle was repeated, and a point of time when the discharge voltage of the battery reached 0 V was determined as a life. The results are shown in Table 5 below.

TABLE 5

Results of Life Test

| | |
|---|---|
| Example 1 | 1,060 cycles |
| Example 2 | 1,130 cycles |
| Example 3 | 1,210 cycles |
| Comparison Example 1 | 820 cycles |
| Comparison Example 2 | 180 cycles |

From Table 5 above, it is clear that the lead-acid storage batteries respectively provided with the hybrid negative plates of the invention described in Examples 1, 2, and 3 are individually remarkably improved in the cycle life, as compared with the lead-acid storage battery provided with the conventional hybrid negative plate described in Comparison Example 1 or the lead-acid storage battery provided with the common negative plate described in Comparison Example 2.

EXAMPLE 4

Next, using the carbon mixture paste of Table 1 and negative plates each having a width of 102 mm, a height of 108.5 mm and a thickness of 1.5 mm, a number of hybrid negative plates were produced in the same manner as in Example 1. On the other hand, a number of positive plates each having a width of 102 mm, a height of 107.5 mm and a thickness of 1.7 mm were produced.

With respect to a flooded type lead-acid storage battery of a B24 size according to JIS D 5301, which has a width of 126 mm, a length of 236 mm and a height of 200 mm and comprises 6 cells an element assembled by alternately stacking 7 sheets of the above-mentioned hybrid negative plates and 6 sheets of the above-mentioned positive plates through 1.0-mm thick laminated separators made of glass fiber nonwoven fabric laminated on the surface of polyethylene, was contained in each cell chamber of the battery through spacers in the same manner as in Example 1 so that the element compression was made 20 kPa. Then, the cells were connected in series in accordance with a common method and a cover was put thereon, and thereafter 450 ml of a sulfuric acid electrolytic solution was poured into each of the cell chambers and was then adjusted so that the specific gravity of the electrolytic solution became 1.285 after formation the container, so that a flooded type lead-acid storage battery having a 5-hour rate capacity of 42 Ah was produced.

Using the flooded type lead-acid storage battery thus produced, a life test was conducted at an ambient temperature of 25° C. under the following conditions for an idling-stop system vehicle. Namely, the discharging operation was conducted at 45 A for 59 seconds and subsequently the discharging operation was conducted at 300 A for one second, and then the charging operation at a constant voltage of 14.0 V was conducted at 100 A for 60 seconds. A cycle of the above-mentioned charging and discharging operations was repeated 3,600 times, and thereafter the resultant battery was allowed to stand for 48 hours, and the above-mentioned charging and discharging operations were repeated again. A point of time when the voltage of the storage battery became 7.2 V was determined to be its' life, and the number of cycles at that time was determined as a cycle life. The result is shown in Table 6 below.

TABLE 6

Results of Life Test

| | |
|---|---|
| Example 4 | 85,000 cycles |
| Example 5 | 88,000 cycles |
| Example 6 | 90,000 cycles |
| Comparison Example 3 | 75,000 cycles |
| Comparison Example 4 | 35,000 cycles |

EXAMPLE 5

A number of hybrid negative plates were produced in the same manner as in Example 4 except that the carbon mixture paste as shown in Table 2 was used. Using these hybrid negative plates, a flooded type lead-acid storage battery having a 5-hour rate capacity of 42 Ah was produced in the same manner as in Example 4.

Using this battery, a cycle life test was conducted in the same manner as in Example 4. The result is shown in Table 6.

EXAMPLE 6

A number of hybrid negative plates were produced in the same manner as in Example 4 except that the carbon mixture paste as shown in Table 3 was used. Using these hybrid negative plates, a flooded type lead-acid storage battery having a 5-hour rate capacity of 42 Ah was produced in the same manner as in Example 4.

Using this battery, a cycle life test was conducted in the same manner as in Example 4. The result is shown in Table 6.

COMPARISON EXAMPLE 3

A number of hybrid negative plates were produced in the same manner as in Example 4 except that the conventional carbon mixture paste as shown in Table 4 was used. Using these hybrid negative plates, a flooded type lead-acid storage battery having a 5-hour rate capacity of 42 Ah was produced in the same manner as in Example 4.

Using this battery, a cycle life test was conducted in the same manner as in Example 4. The result is shown in Table 6.

COMPARISON EXAMPLE 4

Using the negative plates described in Example 4, each of which has no carbon mixture paste applied, a flooded type lead-acid storage battery having a 5-hour rate capacity of 42 Ah was produced in the same manner as in Example 4. Using this battery, a cycle life test was conducted in the same manner as in Example 4. The result is shown in Table 6.

As can be seen from Table 6, the flooded type lead-acid storage batteries respectively provided with the hybrid negative plates described in Examples 4, 5, and 6 are individually remarkably improved in the cycle life, as compared with the flooded type lead-acid storage battery provided with the conventional hybrid negative plate described in Comparison Example 3 and the flooded type lead-acid storage battery provided with the common negative plate described in Comparison Example 4.

The invention claimed is:

1. An electrode comprising active battery material for a lead-acid storage battery, wherein a surface of the electrode is provided with a coating layer comprising a carbon mixture containing composite carbon particles, wherein each of the composite carbon particles comprises a particle of a first capacitor carbon material with particles of a second electrically conductive carbon material adhered to a surface of the first capacitor carbon material, and wherein a surface coverage on the particles of the first capacitor carbon material by the second electrically conductive carbon material is at least 20%.

2. The electrode according to claim 1, wherein the surface coverage on the particles of the first capacitor carbon material by the second electrically conductive carbon material is at least 50%.

3. The electrode according to claim 1, wherein a particle size of the second electrically conductive carbon material is one-fifth or less of that of the first capacitor carbon material.

4. The electrode according to claim 1, wherein the ratio by weight % of the first capacitor carbon material to the second electrically conductive carbon material is between 15:1 to 10:8.

5. The electrode according to claim 1, wherein the first capacitor carbon material is a high specific surface area carbonaceous material that has a specific surface area of at least 500 $m^2/g$ measured by adsorption using BET isotherm.

6. The electrode according to claim 1, wherein the first capacitor carbon material is activated carbon.

7. The electrode according to claim 1, wherein the second electrically conductive carbon material is selected from at least one of carbon black, graphite, glassy carbon, and a nanocarbon fiber.

8. The electrode according to claim 1, wherein the coating layer of the carbon mixture comprises 4 to 100 parts by weight of the second electrically conductive carbon material relative to 100 parts by weight of the first capacitor carbon material.

9. The electrode according to claim 1, wherein an amount of the carbon mixture for the coating layer of the electrode is 1 to 15% by weight relative to a weight of the active battery material on the electrode.

10. The electrode according to claim 1, wherein the electrode is a negative electrode comprising negative active battery material for a lead-acid storage battery.

11. The electrode according to claim 1, wherein the composite carbon particles are produced by at least one of grinding, granulating and unifying, the particles of the first capacitor carbon material with the particles of the second electrically conductive carbon material.

12. The electrode according to claim 1, wherein the composite carbon particles are produced by bead or ball milling.

13. An electrical storage device for a lead acid based system comprising the electrode according to claim 1.

14. The electrical storage device of claim 13, wherein the device is a lead-acid storage battery.

15. An electrical storage device comprising at least one lead dioxide based positive electrode and at least one sponge lead based negative electrode in a sulphuric acid electrolyte solution, wherein the negative electrode comprises:
a current collector;
a first layer deposited on the current collector, the first layer comprising active battery material of sponge lead;
a second layer in contact with at least a portion of the first layer, the second layer comprising composite carbon particles, wherein each of the composite carbon particles comprises a particle of a first capacitor carbon material with particles of a second electrically conductive carbon material adhered to a surface of the first capacitor carbon material, and wherein a surface coverage on the particles of the first capacitor carbon material by the second electrically conductive carbon material is at least 20%.

16. A method for preparing an electrode comprising active battery material for a lead-acid storage battery, wherein the method comprises:
preparing composite carbon particles by at least one of grinding, granulating and unifying, particles of a first capacitor carbon material with particles of a second electrically conductive carbon material having a particle size less than that of the first capacitor carbon material, whereby each composite carbon particle comprises a particle of the first capacitor carbon material with particles of the second electrically conductive carbon material adhered to a surface of the first capacitor carbon material such that a surface coverage on the particles of the first capacitor carbon material by the second electrically conductive carbon materials is at least 20%;
preparing a carbon mixture comprising the composite carbon particles; and
providing the carbon mixture as a coating on at least a portion of the surface of an electrode comprising active battery material for a lead-acid storage battery.

17. An electrode comprising active battery material for a lead-acid storage battery, wherein the surface of the electrode is provided with a coating layer comprising a carbon mixture containing composite carbon particles, wherein each of the composite carbon particles comprises a particle of a first capacitor carbon material with particles of a second electrically conductive carbon material adhered to a surface of the first capacitor carbon material, wherein a surface coverage on the particles of the first capacitor carbon material by the second electrically conductive carbon material is at least 20%, and wherein the carbon mixture further comprises a third electrically conductive carbon material.

18. The electrode according to claim 17, wherein the third electrically conductive carbon material is selected from at least one of carbon black, graphite, glassy carbon, and a nanocarbon fiber.

19. The electrode according to claim 17, wherein the surface coverage on the particles of the first capacitor carbon material by the second electrically conductive carbon material is at least 50%.

20. The electrode according to claim 17, wherein a particle size of the second electrically conductive carbon material is one-fifth or less of that of the first capacitor carbon material.

21. The electrode according to claim 17, wherein the ratio by weight % of the first capacitor carbon material to the second electrically conductive carbon material is between 15:1 to 10:8.

22. The electrode according to claim 17, wherein the first capacitor carbon material is a high specific surface area carbonaceous material that has a specific surface area of at least 500 $m^2/g$ measured by adsorption using BET isotherm.

23. The electrode according to claim 17, wherein the first capacitor carbon material is activated carbon.

24. The electrode according to claim 17, wherein the second electrically conductive carbon material is selected from at least one of carbon black, graphite, glassy carbon, and a nanocarbon fiber.

25. The electrode according to claim 17, wherein the coating layer of the carbon mixture comprises 4 to 100 parts by weight of the second electrically conductive carbon material relative to 100 parts by weight of the first capacitor carbon material.

26. The electrode according to claim 25, wherein the coating layer of the carbon mixture further comprises 50 parts by weight or less of the third electrically conductive carbon material relative to 100 parts by weight of the first capacitor carbon material.

27. The electrode according to claim 17, wherein the coating layer of the carbon mixture comprises 4 to 100 parts by weight of the second electrically conductive carbon material relative to 100 parts by weight of the first capacitor carbon material, 50 parts by weight or less of the third electrically conductive carbon material, 2 to 30 parts by weight of a binder, 20 parts by weight or less of a thickener, and 20 parts by weight or less of a short fiber relative to 100 parts by weight of the first capacitor carbon material.

28. The electrode according to claim 17, wherein an amount of the carbon mixture for the coating layer of the electrode is 1 to 15% by weight relative to a weight of the active battery material on the electrode.

29. The electrode according to claim 17, wherein the electrode is a negative electrode comprising negative active battery material for a lead-acid storage battery.

30. The electrode according to claim 17, wherein the composite carbon particles are produced by at least one of grinding, granulating and unifying the particles of the first capacitor carbon material with the particles of the second electrically conductive carbon material.

31. The electrode according to claim 17, wherein the composite carbon particles are produced by bead or ball milling.

32. An electrical storage device for a lead acid based system comprising the electrode according to claim 17.

33. The electrical storage device of claim 32, wherein the device is a lead acid storage battery.

34. An electrical storage device comprising at least one lead dioxide based positive electrode and at least one sponge lead based negative electrode in a sulphuric acid electrolyte solution, wherein the negative electrode comprises:
    a current collector;
    a first layer deposited on the current collector, the first layer comprising active battery material of sponge lead;
    a second layer in contact with at least a portion of the first layer, the second layer comprising composite carbon particles, wherein each of the composite carbon particles comprises a particle of a first capacitor carbon material with particles of a second electrically conductive carbon material adhered to a surface of the first capacitor carbon material, and wherein a surface coverage on the particles of the first capacitor carbon material by the second electrically conductive carbon material is at least 20%, and the second layer further comprising a third electrically conductive carbon material.

35. A method for preparing an electrode comprising active battery material for a lead-acid storage battery, wherein the method comprises:
    preparing composite carbon particles by at least one of grinding, granulating and unifying, particles of a first capacitor carbon material with particles of a second electrically conductive carbon material having a particle size less than that of the first capacitor carbon material, whereby each composite carbon particle comprises a particle of the first capacitor carbon material with particles of the second electrically conductive carbon material adhered to a surface of the first capacitor carbon material such that a surface coverage on the particles of the first capacitor carbon material by the second electrically conductive carbon material is at least 20%;
    preparing a carbon mixture comprising the composite carbon particles and a third electrically conductive carbon material; and
    providing the carbon mixture as a coating on at least a portion of the surface of an electrode comprising active battery material for a lead-acid storage battery.

* * * * *